United States Patent

[11] 3,614,534

[72] Inventor Thomas A. O. Gross
Concord Road R.F.D., Lincoln, Mass. 01773
[21] Appl. No. 50,453
[22] Filed June 29, 1970
[45] Patented Oct. 19, 1971

[54] GROUND-FAULT-RESPONSIVE ELECTRICAL PROTECTIVE SYSTEMS
17 Claims, 3 Drawing Figs.

[52] U.S. Cl. .................................................... 317/18 D,
317/27 R, 317/33 SC, 317/49
[51] Int. Cl. .................................................... H02h 3/28
[50] Field of Search .......................................... 317/18 D,
27 R, 33 SC, 49

[56] References Cited
UNITED STATES PATENTS

| | | | |
|---|---|---|---|
| 2,594,372 | 4/1952 | Wattenberger | 317/27 X |
| 3,210,606 | 10/1965 | Calhoun | 317/27 X |
| 3,473,091 | 10/1969 | Morris et al. | 317/18 D |
| 3,504,234 | 3/1970 | Fitzgerald | 317/27 |

Primary Examiner—James D. Trammell
Attorney—William D. Roberson

ABSTRACT: To prevent possible electrocutions and to minimize the risk of fires caused by insulation faults in electrical power distribution systems, a protective system responsive to ground faults interrupts the electrical power. Ground faults are detected by differential impedances in the supply conductors of the distribution system, which develop differential potentials in response to unbalanced currents in the supply conductors. These differential potentials are tapped and supplied to a signal mixer which develops a ground-fault-indicating output signal, the magnitude of which depends on the degree of current imbalance. Output signals exceeding a threshold value trip a circuit breaker to remove power from the load conductors. Unlike some currently popular ground fault systems, the combination can be made very sensitive to ground faults of either high or low resistances.

PATENTED OCT 19 1971 3,614,534

INVENTOR.
THOMAS A. O. GROSS
BY
*William D. Roberson*
ATTORNEY 3,614,534

GROUND-FAULT-RESPONSIVE ELECTRICAL PROTECTIVE SYSTEMS

BACKGROUND

In the U.S.A. and most other countries, domestic and factory electrical wiring is grounded; the power is distributed by two or more conductors of which one is connected to earth. Shock hazards exist whenever faulty insulation in appliances or on the ungrounded lines permits current to flow to ground via conductors independently of the electrical system. Electrocution can occur, for example, when an operator of a handheld electrical tool with defective insulation makes bodily contact with a solid ground such as water pipe and thus provides a bridge for current to flow from the ungrounded line to earth. This hazard has led to the widespread adoption of three-wire grounding power cords for electrical tools and these are effective as long as the grounding wire has not been interrupted by accident or by corrosion over long periods of time. Unfortunately the failure of the grounding wire can take place without warning. Furthermore there are special situations such as are presented by electrical accessories of swimming pools which cannot be effectively grounded.

Fault currents due to insulation failure or the accidental contact by a person to a live electrical line cause an imbalance in the supply conductors which can be exploited to detect the malfunction or accident. Equipments based upon the principal have been developed to interrupt the electrical supply when fault currents occur with sufficient magnitude to cause electrocution.

Fault current sensors in widespread use today use a differential transformer comprising two or more bifilar primary windings and a secondary winding all wound on a closed magnetic core. The primary windings conduct the powerline current and are connected in phase opposition to the normal balanced loads. Zero net flux exists in the core regardless of the load current, as long as the currents in the primary windings are equal; no voltage is induced in the secondary winding of an ideal differential transformer unless a current imbalance exists. Typically an authoritative signal to interrupt electrical power is desired with unbalanced currents greater than 0.005 amperes in the primary windings. However, in normal service these windings may have to carry load currents on the order of 50 amperes. Rejection of the effects of normal load currents four or more orders of magnitude larger than the differential current requires precision and careful arrangement of the windings. A gapless tape-wound toroidal core is generally used to obtain the best possible magnetic properties. Processing of the comparatively feeble fault signal requires a large number of secondary turns which involves a costly toroidal winding operation.

More serious than the cost of the differential transformer is the failure of the differential transformer to function when any of its primary windings are short circuited. A case of practical importance is a fault downstream from the differential transformer between the neutral powerline and earth. This fault may appear as a low-resistance short across one of the primary windings which, by virtue of the close coupling between windings, reflects as a short across the secondary winding effectively killing any warning signal.

BRIEF SUMMARY OF THE INVENTION

This invention provides an improved means for the prevention of electrocution and fires caused by insulation faults in electrical power distribution systems.

A preferred embodiment of this invention avoids the serious difficulty which prior systems experienced in connection with neutral-to-ground short circuits by replacing the differential transformer of such systems with two simple magnetic devices of low cost. Impedances are inserted in the load conductors. Preferably these impedances take the form of a plurality of windings, one inserted in each of the supply conductors, linked by a single closed magnetic core to form what will hereafter be termed differential impedances. Unlike the primary windings of the differential transformer these windings need not be closely coupled. Sufficient coupling to cancel the saturating effects of normal load currents is obtained even if the two coils are clustered on opposite sides of the core.

Each of the windings of the differential impedance is connected to a respective primary winding of a summing transformer. In two-wire electrical systems, a preferred construction uses conventional "EI" laminations. The two primary windings are wound on the side legs and the secondary on the center leg. A three-wire system may use three "UI" or "LL" laminated cores with a primary winding on one leg of each core and a secondary winding encircling all three remaining legs. Electrical supply systems with more than three wires are not usual, but the invention can be extended to any number. In the absence of an imbalance in currents flowing in the differential impedance windings the voltage impressed on the summing transformer primary windings is due to IR drops in the differential impedance plus a component due to leakage reactance caused by flux which links one winding but not the other. The summing transformer primary windings are connected with polarity such as to cause the resultant magnetic flux generated by the normal mode voltages to add in the side legs but cancel in the center leg.

Voltages developed across the differential impedance due to differential current cause the fluxes in the side legs of the summing transformer to be in opposition but additive in the center leg where they induce a fault signal voltage in the secondary winding.

As is the case with the conventional differential transformer, the summing transformer secondary winding should have a large number of turns to facilitate the processing of the signal by amplifiers or detectors. However the laminated core structure of the summing transformer permits the use of coil bobbins or paper layer coils which can be produced at low cost with high-speed winding machinery.

A low-resistance short circuit across either of the differential impedance windings (such as can occur with a downstream neutral-to-ground fault) still leaves the flux in the summing transformer generated by the IR drops plus leakage reactance drops of the unshorted winding (or windings) unopposed and free to pass in the center leg. The short-circuited primary winding of the summing transformer tends to prevent flux changes in its leg which further enhances the signal induced in the secondary winding. A large signal which may be used to interrupt the circuit is produced as long as current drawn by normal loads or by a fault flows through the unshorted winding. The invention is therefore responsive to fault currents which can cause electrocution, whether the neutral-to-ground fault is of high or low resistance

INTRODUCTION TO THE DRAWINGS

Further details of the invention as well as additional advantage will be more clearly understood in connection with the following detailed description taken with the accompanying drawings wherein.

DETAILED DESCRIPTION

Figure 1:
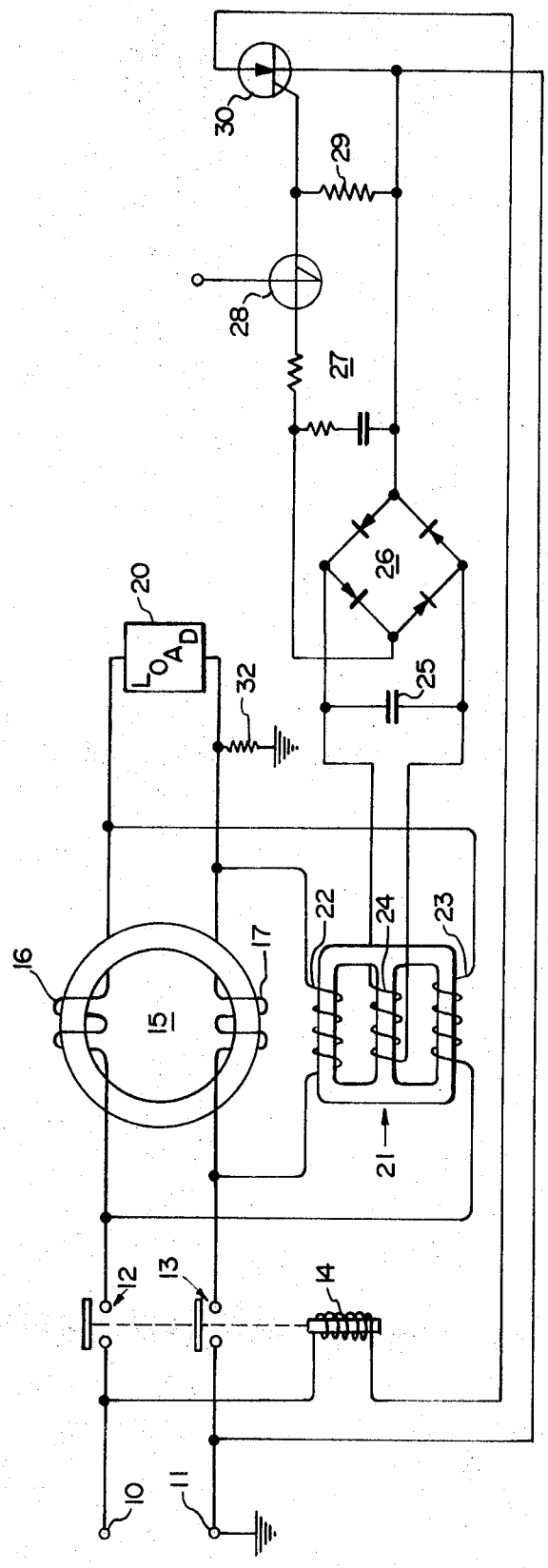
FIG. 1 is a schematic diagram of a preferred form of Ground-Fault-Responsive Electrical Protective System constructed in accordance with the present invention.

Although the invention has broad application to electrical distributions having any number of supply conductors, the preferred example illustrated in FIG. 1 is shown incorporated in a two-wire electrical system. Supply conductors 10 and 11 are intended for connection to a source of alternating current, conductor 11 being grounded at the source. These conductors supply power through the normally closed contacts 12 and 13 of circuit breaker 14 and through a differential impedance combination 15 having associated windings 16 and 17 respectively to a load represented at 20.

The differential impedance combination 15 can take different forms, but in the preferred form shown in this illustration it comprises a toroidal core of high permeability material such as Permalloy upon which are wound a plurality of windings, one for each of the supply conductors of the power supply circuit. Windings 16 and 17 are wound such that the common mode currents and 23 them set up equal and opposing fluxes in the associated core. As a consequence, the magnetic fluxes due to common mode currents cancel each other and no potentials are induced in either winding. Each winding does experience a potential drop, however, as a result of the IR drop therein plus a drop due to leakage reactance times the current. The magnetic core structure of the differential impedance combination 15 is preferably formed of a wound Permalloy tape. The windings 16 and 17 may or may not be wound as bifilar construction. The windings may have three or four turns preferably and need be coupled only tightly enough to avoid saturation if the core during the intended operation of the system.

The potentials developed across the windings of the differential impedance combination are galvanically coupled to a signal-mixing comparator which, in the preferred example illustrated, takes the form of a summing transformer 21. Summing transformer 21 can be of relatively simple construction, having a Permalloy core formed of punched E-I laminations and having inserted thereon a pair of primary windings 22 23 3 and a secondary winding 24. The primary windings, which represent the input port of the device, may have approximately 25 turns apiece; the output port is provided by the secondary winding which may have from 8,000 to 10,000 turns.

The signal developed in the output winding 24 may be used under appropriate conditions to control the actuation of circuit breaker 14 to disconnect the load 20 from the source of electrical supply. For this purpose the output signal from winding 24 is applied across a capacitor 25 selected to resonate with the secondary or output winding 24 at a frequency of 60 Herz or lower to discriminate against transients. The signal thus developed is applied to the full-wave rectifier 26 which presents a direct-current output signal to network 27. In network 27 a silicon unilateral switch (SUS) 28 gates only those signals exceeding a predetermined value. An SUS is a silicon planar, monolithic integrated electrical circuit having thyristor electrical characteristics closely approximating those of an ideal four-layer diode. It switches at relatively low voltages by about 8 volts. Signals gated by SUS 28 are supplied across resistor 29 ro the silicon controlled rectifier 30. The resistor 29 is provided to prevent false firing of the controlled rectifier, an event which might otherwise occur as a result of sudden changes in line voltage across conductors 10 and 11. When the controlled rectifier 30 is triggered into conduction by a signal applied to it through the silicon unilateral switch 28, the circuit breaker 14 is energized to open contacts 12 and 13. Once energized, the circuit breaker 14 is of course latched in its open position.

Figure 2:
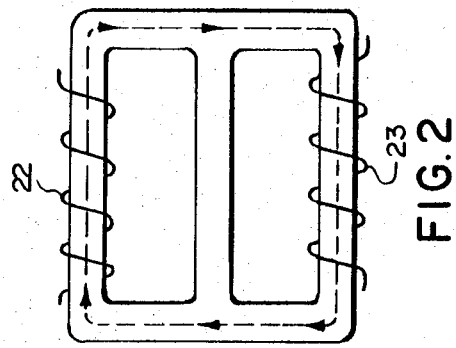
FIG. 2 is a diagram of the summing transformer shown in FIG. 1 illustrating the flux pattern therein as a result of common mode currents in the supply conductors.

As mentioned above, in the absence of an imbalance of currents flowing in the windings 16 and 17 of the differential impedance combination, the voltages impressed on the input or primary windings of he summing transformer 21 result only from the IR drop in each of the differential impedance windings plus a component due to the leakage reactance of the windings. These resulting potential drops are of course impressed upon the primary windings 22 and 23 of the summing transformer. The primary windings of the summing transformer are, however, connected with a polarity such as to cause the resultant magnetic flux generated by normal load currents to add in the outer or side legs of the core structure but to cancel in the center core structure as shown in FIG. 2 by the dotted lines representing the flux pattern due to common mode currents in the supply conductors. As a consequence, the net flux linking the secondary or output signal is zero.

Should a fault current develop in the load or in the conductors supplying the load, the circuit responds otherwise. In FIG. 1 there is represented at 32 a fault which results in a current flowing to ground from the neutral side of load 20. The fault current bypasses the path of normal current flow to ground through supply conductor 11, resulting in an imbalance of currents flowing in windings 16 and 17. Ominously, fault 32 may represent a human being in danger of being electrocuted by providing an unintended leakage path through his body for currents to flow to ground. Currents as small as 5 to 10 milliamperes can present a serious danger, since at that level the nervous reaction of the individual can prevent him from letting go of the electrical connection. At higher current level, but far below the level at which overload protective devices will interrupt the circuit, fibrillation can occur, disrupting the heart's rhythmic action and resulting in death. In the sensitive system shown, however the resulting imbalance of currents in windings 16 and 17 is detected, amplified, and employed to disconnect the load from the line.

Figure 3:
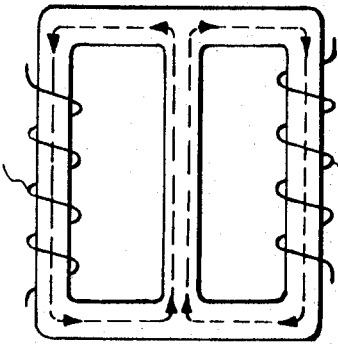
FIG. 3 is diagram similar to FIG. 2 illustrating the flux pattern resulting from differential fault currents in the supply conductors.

Although the normal mode currents give rise to self-cancelling fluxes in the core structure of the differential impedance 15, differential currents in conductors 10 and 11 due to a fault to ground create a net flux liking both windings 16 and 17. Consequently, additional potentials are developed across both windings 16 and 17 as a result of the fault, whether it occurs on the neutral side or the high potential side of the load. These additional potentials are similarly applied to the input or primary windings of the summing transformer, but since they have dissimilar polarities they do not cancel each other. As shown in FIG. 3 the potentials developed as a result of the differential currents in the line conductors create fluxes in the signal-mixing summing transformer which are in opposition to each other in the outer legs of the transformer but which are additive in the center leg. This causes a net flux to link the secondary winding of the summing transformer, developing an output signal in winding 24.

If the fault to ground is a low-resistance short circuit across either winding of the differential impedance combination, the system is not rendered insensitive. Instead a very large signal is produced in the secondary winding of summing transformer 21. The reason for this is that a low-resistance short to ground from either of the supply conductors effectively short circuits one of the windings of the summing transformer 21. As a result the entire potential developed across the unshorted winding of the differential impedance combination gives rise to a flux in the core structure 21 which is unopposed in passing through the center leg of the summing transformer. A short-circuited primary winding of the summing transformer tends to prevent flux changes in its leg, and this further enhances the output signal induced in the secondary winding. A large and useful signal is produced in the secondary winding. 24 as long as the current drawn by a load or by a fault flows through the unshorted winding.

The system thus maintains its sensitivity even in the face of low resistance short circuits to ground from the neutral conductor, The sensitivity of the system is influenced by certain significant factors which may not be immediately apparent. Among these are the relative impedances of windings 16, 17 on the one hand and windings 22, 23 on the other, as well as the degree of coupling between windings 22 and 23. The differential impedances should be proportioned smaller than the impedances of the input windings of the signal comparator 21 so that the principal load currents flow through the differential impedances rather than through the signal comparator. The comparatively large normal load currents, if caused to circulate in the input windings of the summing transformer 21, would tend to cause saturation of portions of the associated core structure, thereby desensitizing the system.

If the absolute value of impedances 16 and 17 were increased toward infinity, most of the line currents would flow through the input windings of the summing transformer 21. The system would then begin to resemble some single-core systems in use today in which all the common mode currents flow through windings on a single core. The resemblance between this system and such prior art single-core ground-fault-interrupted systems would nevertheless not be complete, for in such prior art systems the windings linking a common core structure have almost invariably been tightly coupled, whereas the windings 22 and 23 of the summing transformer are quite obviously loosely coupled because of the multilegged core structure of the summing transformer.

The loose coupling between windings 22 and 23 has an important effect on the behavior of the illustrated system when a short circuit exists from neutral to ground. If the primary or input windings 22 and 23 were tightly coupled to one another, an impedance shorting either one of these windings would reflect across the other. Thus, symmetry of the flux patterns would then not be altered and no fault indication would result. In the illustrated circuit a short circuit to ground from any part of the system necessarily unbalances the flux pattern in the core of summing transformer 21 and thus signals the fault condition authoritatively.

Other factors affect sensitivity. For example, the value of capacitor 25, included to minimize the effect of transients, will affect the speed of response. The trigger potential of SUS 28 defines a threshold value which is quite obviously related to the degree of imbalance necessary to turn on the silicon-controlled rectifier 30. In performance, imbalances as small as 5 milliamperes and smaller in the presence of normal load currents from four to five orders of magnitude larger can readily be detected and employed to trip the sensitive protective system such as this.

In the example illustrated the signal-generator combination 15 has been referred to as a differential impedance combination. This form has special advantages, not the least of which is that the impedance presented to balanced load currents is relatively small, whereas the impedance presented to unbalanced or differential fault currents is comparatively large. Other forms of impedance combinations are also possible. For example, a pair of resistors may be substituted in lines 10 and 11 in place of the windings 16 and 17. If this substitution is made, the impedances of the resistors should be low compared to that offered by the primary input windings of the summing transformer. Matched resistors of low-resistance values work well in electrical systems in which the normal load currents are quite small, but as the load currents increase, the loss of line potential due to IR drops in the resistors becomes a disadvantage. In place of wound impedances or resistors there may also be substituted a pair of matched capacitors. These would have the advantage of discriminating against transients which might cause false circuit interruption. If normal load currents tended to cause too large a potential drop across such capacitors, they could be arranged in series circuit with inductors with the LC combinations tuned to resonate at the supply frequency. Such an arrangement would be especially useful in a high-frequency electrical supply system of 400 Hz., particularly one with modest load requirements of 5 amperes or less.

The invention is capable of still other modifications and variations in execution. The signal-mixing comparator, shown in the illustration as a summing transformer, may comprise, instead of the unitary core structure, a plurality of separate cores, each looped by a respective input winding with a common output winding looping all such cores to provide a common output signal resulting from the comparative mixing of the input signals.

The invention is capable of many other modifications and variations in its execution. For example, in place of the full-wave rectifier shown at 26 a voltage-doubling rectifier could be substituted with a consequent reduction in the signal level required to trigger SUS 28. The SUS itself could be replaced by other triggering devices, and a solid-state signal amplifier can be added to the system to improve sensitivity still further, especially where it is desired to detect very small imbalances in the load conductor currents.

Aside from these variations, the invention is applicable to electrical systems having more than two supply conductors. Of course a three-wire electrical system may require modifications of the core structures. In a three-wire system, whether single phase or three phase, the three differential impedances in the supply conductors may still be wound on a simple closed core. Preferably the core structure of the summing transformer should have a separate leg for each of the input windings, with a still further leg or legs for the output winding or windings to provide the desired looseness of coupling between primary or input windings.

It should thus be clear that the practice of the invention is not limited to the precise form shown in the example selected for illustration and that still further embodiments of the invention are possible within the scope of the appended claims.

1. A sensitive protective circuit breaker system for detecting a high-resistance line-to-ground short circuit or an abnormal leakage current to ground from conductors forming at least one path in an electrical circuit connected to supply conductors from a source of electricity, one of the supply conductors being grounded at the source of electricity, comprising:
  current-interrupting means adapted to be connected into the supply conductors;
  impedance means connectable in each of said supply conductors for developing electrical potentials thereacross in response to currents of different magnitudes in said supply conductors;
  signal comparator means having a plurality of input ports, each coupled to a separate one of said impedance means to receive potentials developed thereacross as a result of currents in said supply conductors, and an output port for developing an output signal responsive to the potentials applied to said input ports, said signal comparator means being so constructed that normal load currents flowing in said supply conductors give rise to a net output signal, the magnitude of which varies with such differential currents; and
  means responsive to the attainments by said output signal of a predetermined threshold value for causing said current-interrupting means to interrupt current flow through said supply conductors.

2. The system of claim 1 wherein each of said impedance means has an absolute value of impedance substantially less than that of the corresponding input port coupled thereto, such that most of the currents in said line conductors pass through said impedance means rather than through said input ports.

3. The system of claim 1 wherein said impedance means comprises a highly permeable magnetic core structure having a plurality of impedance windings thereon, each connected in series circuit with a respective one of said supply conductors, and so connected that the fluxes induced in said core structure by said windings due to normal load currents in said supply conductors are in opposition.

4. The system of claim 3 wherein said core structure comprises a single closed magnetic circuit on which each of said impedances windings is wound.

5. The system of claim 1 in which said signal comparator means comprises a summing transformer with a highly permeable magnetic core structure wherein each of said input ports comprises a separate input winding on said core structure and wherein said output port comprises winding turns inductively coupled to a portion of said core structure to be linked by a net flux developed herein by said primary windings.

6. The system of claim 5 wherein said input windings are loosely coupled to each other on said summing transformer core structure.

7. The system of claim 6 wherein said summing transformer core structure comprises a plurality of separate legs on each of which is positioned a respective one of said input windings.

8. A sensitive protective system for an electrical circuit for providing power to a load from at least two supply conductors, one of said conductors being grounded at the source, comprising:

signal-generating impedance means connectable in each of such supply conductors for developing electrical potentials in response to currents of different magnitudes in such supply conductors; and signal comparator means having a plurality of input ports, each coupled to a respective one of said impedance means to receive signals as a result of currents in said supply conductors, and an output port for developing output signals responsive to the potentials applied to said input ports, said signal comparator means being so constructed that normal load currents flowing in said supply conductors give rise to a net output signal of substantially zero, and that differential currents flowing in said supply conductors give rise to a net output signal, the magnitude of which represents the magnitude of imbalance of currents in said supply conductors.

9. The system of claim 8 wherein each of said impedance means has an absolute value of impedance substantially less than of the corresponding input port coupled thereto, such that most of the currents in said line conductors pass through said impedance means rather than through said input ports.

10. The system of claim 8 wherein said impedance means comprises a highly permeable magnetic core structure having a plurality of impedance windings thereon, each connected in series circuit with a respective one of said supply conductors, and so connected that the fluxes induced in said core structure by said windings due to normal load currents in said supply conductors are in opposition.

11. The system of claim 10 wherein said core structure comprises a single closed magnetic circuit on which each of said impedance windings is wound.

12. The system of claim 8 in which said signal comparator means comprises assuming transformer with a highly permeable magnetic core structure, herein each of said input ports comprises a separate input winding on said core structure and wherein said output port comprises winding turns inductively coupled to a portion of said core structure to be linked by a net flux developed therein by said primary windings.

13. The system of claim 12 wherein said input windings are loosely coupled to each other on said summing transformer core structure.

14. The system of claim 13 wherein said summing transformer core structure comprises a plurality of separate legs on each of which is positioned a respective one of said input windings.

15. A sensitive protective system for an electrical circuit for providing power to a load from at least two supply conductors, one of said conductors being grounded at the source, comprising:

signal-generating impedance means comprising a highly permeable magnetic core structure defining at least one closed magnetic circuit and having a plurality of impedance windings thereon, each connected in series circuit with a respective one of said supply conductors and so wound on said core structure that the fluxes induced in said core structure due to normal load currents in said supply conductors are in flux opposition;

summing transformer means having a highly permeable magnetic core structure with a plurality of input windings therein loosely coupled to each other, each of said input windings being connected across a separate one of said impedance windings to receive input signals therefrom, said summing transformer also having an output winding on said core structure to interrupt a net flux developed therein by said primary windings, the impedance presented by each of said input windings to normal load currents in said supply conductors being substantially less than that of the corresponding impedance winding connected thereto, such that most of the currents in said line conductors pass through said impedance windings, whereby said secondary winding has induced therein a fault-characterizing output signal in response to unbalanced current flow in said input windings, such fault-characterizing signal representing the magnitude of current imbalance in said supply conductors.

16. The sensitive protective system of claim 15 wherein said primary windings are arranged so that under normal current conditions the total magnetomotive force produced in the summing transformer core structure is substantially balanced out so that the net flux linking said secondary winding is zero and under current-flowing-to-ground conditions a net flux results which produces an output signal in the secondary winding of said summing transformer.

17. The sensitive protective system of claim 16 further comprising:

circuit-interrupting means responsive to said fault-characterizing output signal for opening the circuit through said supply conductors when said output signal exceeds a predetermined threshold value.

UNITED STATES PATENT OFFICE
CERTIFICATE OF CORRECTION

Patent No. 3 614 534         Dated  October 19, 1971

Inventor(s) Thomas A. O. Gross

It is certified that error appears in the above-identified patent and that said Letters Patent are hereby corrected as shown below:

The line numbering is incorrect in columns 2 through 6.

Col. 1, line 14 after "as" insert -- a --

Col. 2, line 26 after "to" insert -- the --
lines 54, 55 change "advantage" to -- advantages --
Col. 3, line 11 cancel "and 23" and substitute -- flowing within --
line 22 change "if" to -- of --
line 31 change "22 23 3" to -- 22 and 23 --
line 50 change "by" to -- of --
line 51 change "supplied" to -- applied --
line 51 change "ro" to -- to --
line 63 change "he" to -- the --
Col. 4, line 2 after "output" insert -- winding of the summing transformer is zero and the output --
line 16 change "level" to -- levels --
line 26 change "liking" to -- linking --
Col. 5, line 31 after "the" insert -- circuit in a --
line 43 after "primary" insert -- or --
Col. 6, line 38 change "attainments" to -- attainment --
line 64 change "herein" to -- therein --
Col. 7, line 33 change "assuming" to -- a summing --

Signed and sealed this 1st day of August 1972.

(SEAL)
Attest:

EDWARD M.FLETCHER,JR.         ROBERT GOTTSCHALK
Attesting Officer             Commissioner of Patents